Figure 1:
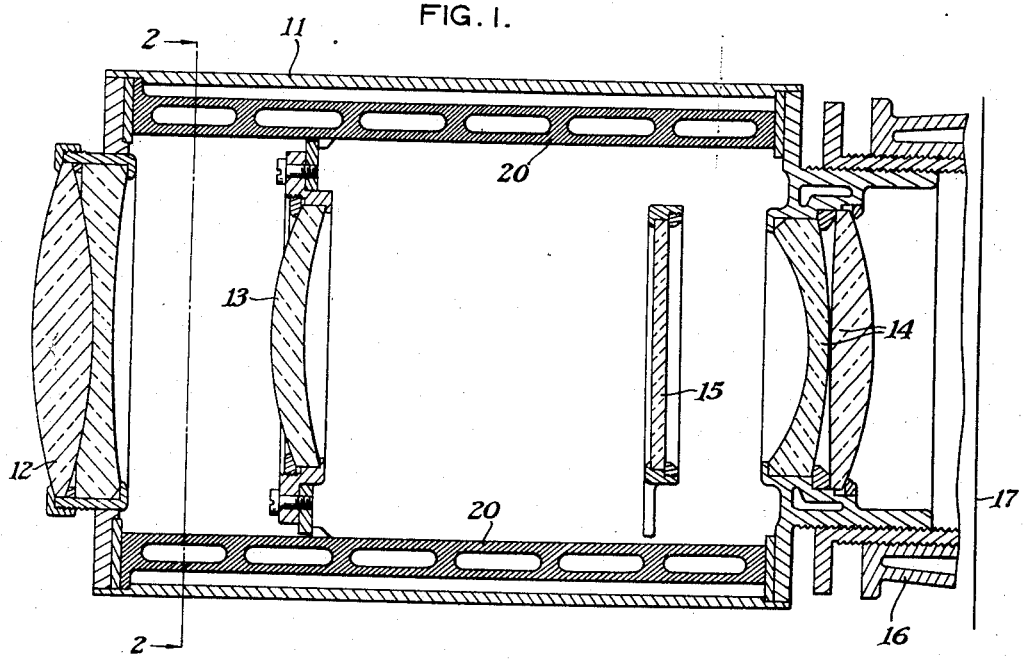

Jan. 9, 1951  C. M. LEE ET AL  2,537,900
TEMPERATURE COMPENSATING LENS MOUNT
Filed Aug. 6, 1947

CHARLES M. LEE
GORDON L. BARRINGER
INVENTORS

BY Newton M. Perrins,
J. Griffin Little
ATTORNEYS

Patented Jan. 9, 1951

2,537,900

UNITED STATES PATENT OFFICE 2,537,900

TEMPERATURE COMPENSATING LENS MOUNT

Charles M. Lee and Gordon L. Barringer, Rochester, N. Y., assignors to Eastman Kodak Company, Rochester, N. Y., a corporation of New Jersey Application August 6, 1947, Serial No. 766,612

11 Claims. (Cl. 88—57)

1

The present invention relates to an optical apparatus, and more particularly to a lens mount therefor.

When a lens mount is subjected to temperature changes, the curvatures of the lens elements are altered and, in addition, the axial spacing of the elements varies. These errors cause a variation in the focal length of the lens system so that the distance between the system and the focal plane continually varies with temperature changes. Therefore, means must be provided to compensate for these errors so as to have the focal plane at all times at the focal point of the lens system, as is apparent.

The invention has as its principal object the provision of members of low thermal expansion secured to the mount to hold the latter and the lens elements against axial movement to maintain the spacing of the elements.

A further object of the invention is the provision of an arrangement by which the lens mount and the lens elements are held against dimensional change in an axial direction when subjected to varying temperatures to maintain the lens spacing, in combination with a metal camera body which is free to expand or contract so as to shift the focal plane to compensate for the change in the focal length of the lens system due to the change in shapes of the lens elements.

Yet another object of the invention is the provision of members of rugged construction which effectively prevent dimensional changes of the lens mount when subjected to temperature variation to hold the lens elements against relative axial movement to maintain a constant lens spacing.

To these and other ends, the invention resides in certain improvements and combinations of parts, all that will be hereinafter more fully described, the novel features being pointed out in the claims at the end of the specification.

Figure 2:
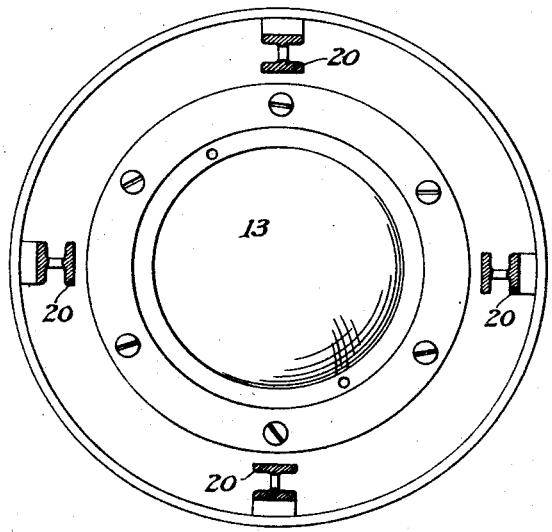

In the drawings:

Fig. 1 is a longitudinal sectional view through the lens mount constructed in accordance with the present invention, showing the relation of the mount parts to the focal plane; and Fig. 2 is a transverse sectional view taken through the mount and substantially on line 2—2 of Fig. 1, showing the relation of expansion retaining-members or I beams to the mount parts.

Similar reference numerals throughout the various views indicate the same parts.

The drawings show a lens mount 11 in which are positioned the axially spaced lens element 12, 13 and 14, each of which is mounted in a suitable lens cell. A filter 15 may also be positioned in the mount in optical alignment with the lens elements, as clearly illustrated in Fig. 1. The lens mount is connected by threads or other suitable means to a camera body, a portion of which is shown at 16 Fig. 1. The rear of the camera body has positioned thereon a focal plane 17, at which point the image formed by the lens system is brought to a sharp focus, as will be readily understood by those familiar with the art. As the camera body per se does not constitute a part of the present invention, only so much of the body will be illustrated as to show its cooperating relation with the lens mount to compensate automatically for the changes in focal length of the lens system due to the temperature variations.

In addition to a change in the curvature of the lens elements and the variation in the spacing thereof, a change in temperature will also expand or contract the metal body of the camera and will move the focal plane relative to the lens systems so as to throw the entire apparatus out of focus. In cameras with small lenses which are used under normal conditions on the ground, these errors are not serious and may be safely corrected. However, in aerial cameras using large lenses and subjected to extreme temperature variations, these errors become appreciable and correction or compensation must be made in order to secure the desired results.

Such correction may be secured, for example, by controlling the change in spacing of the lens cells, or by controlling the actual movement of the mount relative to the focal plane in accord with the temperature changes so as to maintain the point of focus of the lens system at the focal plane. The present invention, however, provides an arrangement by which the mount is constructed so that the lens cells are held rigidly against axial movement so as to retain the axial spacing of the various lens elements, thus eliminating errors due to such spacing. The camera body, which is made of metal, such as aluminum, will expand and contract with temperature changes, but is designed so that its change in length will be such as to compensate exactly for the error due to the change in the curvatures of the lens elements with temperature variations. Thus the lens cells are held rigidly against axial movement, but the metal body portion of the camera may change its length to shift the focal plane an amount which is sufficient to compensate for the change in lens curvature to maintain the focal plane at the focal point of the lens systems.

To secure this result, the mount 11 has positioned thereon a plurality, in the present instance, four, axially extending peripherally space members in the form of I beams 20 made from a material which has substantially negligible coefficient of expansion such, for example, as an alloy known by the name of "Invar" and having a composition of about 63% iron, and 37% nickel, and a coefficient of expansion of about .08 x 10⁶. These "Invar" beams have an extremely low coefficient of expansion and remain substantially constant in length over a wide range of temperatures. The lens cells which carry the lens element are connected directly to these "Invar" beams so that the spacing of the lens elements 12, 13, and 14 remains substantially constant over a wide range of temperature variations. In order to obtain the proper focus, the focal plane 17 floats or moves axially by reason of expansion and/or contraction of the camera body. Such movement of the focal plane is in the proper direction and amount so as to maintain the focal point of the lens system always at the focal plane with any temperature condition encountered. Thus, the lens elements are held against axial movement, while the focal plane moves in accord with the temperature changes to compensate for the change in focal length due to change in lens curvature to maintain the proper focus of the lens system.

While one embodiment of the invention has been disclosed, it is understood that the inventive idea may be carried out in a number of ways. This application is, therefore, not to be limited to the precise details described, but intended to cover all variations and modifications thereof falling within the scope of the appended claims.

We claim:

1. In an optical apparatus, the combination with a lens mount having positioned therein a lens system the focal length of which varies with temperature changes, of means secured to said mount and connected to said system for holding the latter against expansion or contraction when subjected to said changes, a body portion formed of an expansible material the axial dimension of which varies with temperature, and means defining a focal plane on said body portion movable toward and away from said mount as said dimension varies to alter the distance between said plane and mount to compensate for the variation in said focal length.

2. In an optical apparatus, the combination with a lens mount having positioned therein a lens system the focal length of which varies with temperature changes, of a body portion formed of an expansible material the axial dimension of which varies with temperature, a rigid member of a negligible coefficient of expansion secured to said mount and connected to said system to hold the latter against dimensional changes, and means defining a focal plane carried by said body and movable axially with said body and relative to said mount upon changes in the axial dimension of said body to vary the distance between said mount and plane to compensate for changes in the focal length of said system.

3. In an optical apparatus, the combination with a lens mount having positioned therein a lens system the focal length of which varies with temperature changes, of a body portion formed of an expansible material the axial dimension of which varies with temperature, a plurality of axially extending peripherally spaced members of negligible coefficient of expansion carried by said mount to hold the latter against dimensional changes, means for connecting the lenses of said lens system to said spaced members and means defining a focal plane carried by said body and movable axially therewith and relative to said mount as said body changes size due to temperature changes to alter the distance between the mount and plane in accordance with the temperature change to compensate for changes in said focal length.

4. In an optical apparatus, the combination with a lens mount having positioned therein a lens system comprising a plurality of axially aligned and spaced lens elements the curvatures of which change with temperature to vary the focal length of said system, of a body portion of metal which expands and contracts with temperature changes, a plurality of beam members secured to and extending axially of said mount, means for connecting said lens elements to said beamed members, said beams being formed of a material having a substantially negligible coefficient of expansion so that said mount will not change dimensions when subjected to temperature variations to maintain the spacing of said elements, and means defining a focal plane carried by said body and movable therewith when the latter expands and contracts to shift the position of said plane relative to said mount and in accordance with temperature to compensate automatically for the change in the focal length of said system.

5. In an optical apparatus, the combination with a lens mount having positioned therein a lens system, the focal length of which varies with temperature changes, a metal body secured to said mount and having means defining a focal plane spaced axially from said mount, of a plurality of members of substantially negligible coefficient of expansion secured to and extending longitudinally of said mount to hold the latter against axial dimensional alterations when subjected to temperature changes, means for connecting the lenses of said lens system to said spaced members the latter causing said body to change in length to shift the axial position of the plane relative to said mount to provide the sole adjustment for compensating for the change of focal length.

6. In an optical apparatus, the combination with a lens mount having positioned therein a lens system comprising a plurality of lens elements the curvatures of which vary with temperature changes to alter the focal length of said system, a metal body secured to said mount and having means defining a focal plane spaced axially from said mount, of a plurality of members of substantially negligible coefficient of expansion carried by said mount to hold the latter against axial expansion to maintain the spacing of said elements so that the change in the focal length of said system will be due solely to the change in curvature of said elements, means for connecting said lens elements to said beamed members, said body expanding with temperature changes to shift the axial position of said focal plane to compensate for the change in focus due to change in said curvatures.

7. In an optical apparatus, the combination with a lens mount having positioned therein a lens system the focal length of which varies with temperature changes, a metal body secured to said mount and having means defining a focal plane spaced axially from said mount, of a plurality of longitudinally extending members secured to said mount to hold the latter against dimensional change, means for connecting the lenses of said lens system to said spaced members, said member being formed of an alloy compound of substantially 63% iron and 37% nickel and with a coefficient of expansion of about $0.8 \times 10^6$, said metal body changing its dimensions with temperature to shift the axial position of said focal plane to compensate for the change in focal length of said system.

8. In a lens mount, the combination with a lens tube, a lens system comprising a plurality of lens elements positioned within said tube, of members having a substantially negligible coefficient of expansion secured to said tube and connected to all of said elements to hold the latter against dimension change to prevent relative movement of said elements when subjected to varying temperatures.

9. In a lens mount, the combination with a lens tube, a lens system comprising a plurality of axially spaced lens elements mounted in said tube, of a plurality of longitudinally extending members having a substantially negligible coefficient of expansion secured to said mount and connected to all of said elements to hold the elements against relative axial movement when subjected to temperature changes to maintain a constant lens spacing.

10. In a lens mount, the combination with a lens tube, a lens system comprising a plurality of axially spaced lens elements mounted in said tube, of a plurality of axially extending peripherally spaced beam members of a substantially negligible coefficient of expansion secured to said mount, and means for connecting the lens elements to said spaced beam members to hold said elements against axial movement when subjected to temperature changes to provide a constant lens spacing.

11. In a lens mount, the combination with a lens tube, a lens system comprising a plurality of axially spaced lens elements mounted in said tube, of a plurality of axially extending beam members secured to said mount, and means for connecting the lens elements to said spaced beam members to hold the latter against axial dimension change when subjected to temperature variations to maintain a constant spacing of said elements with temperature changes, said members, being formed of an alloy of about 63% iron and 37% nickel and having a coefficient of expansion of about $0.8 \times 10^6$.

CHARLES M. LEE.
GORDON L. BARRINGER.

REFERENCES CITED

The following references are of record in the file of this patent:

UNITED STATES PATENTS

| Number | Name | Date |
|---|---|---|
| 1,325,936 | Fouasse | Dec. 23, 1919 |
| 2,219,224 | French | Oct. 22, 1940 |
| 2,234,707 | Ort | Mar. 11, 1941 |
| 2,240,827 | Bangert et al. | May 6, 1941 |
| 2,341,364 | Crumrine | Feb. 8, 1944 |
| 2,423,491 | Fairbank | July 8, 1947 |
| 2,423,492 | Fairbank | July 8, 1947 |
| 2,430,551 | Arnold et al. | Nov. 11, 1947 |